Figure 11:
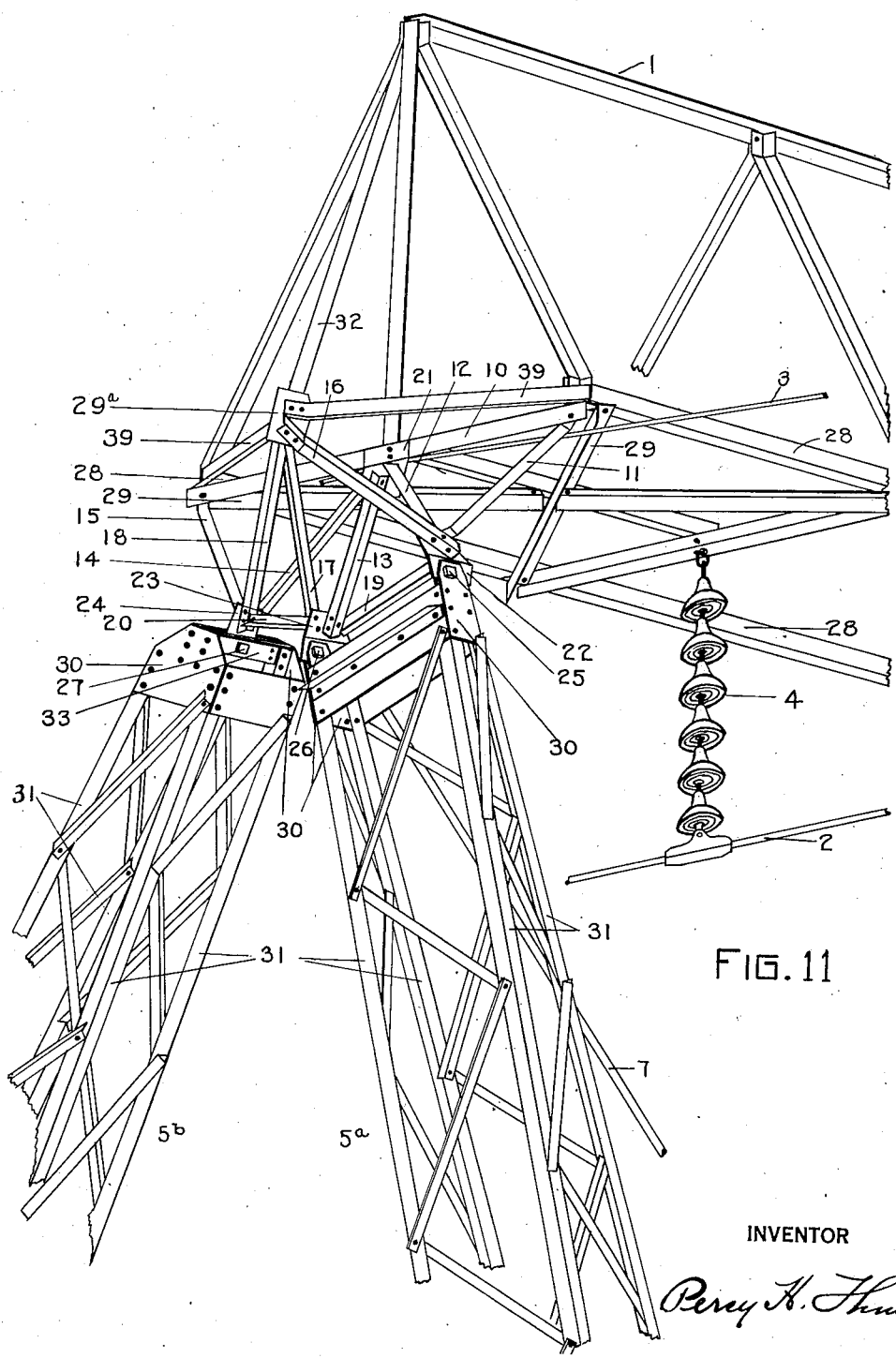

Feb. 8, 1927.
P. H. THOMAS
1,616,932
UNIVERSAL TRANSMISSION TOWER
Filed March 10, 1926   3 Sheets-Sheet 1
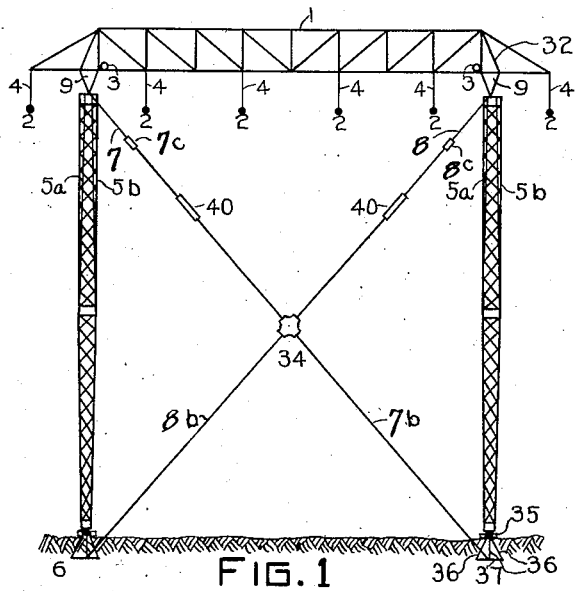
FIG.1
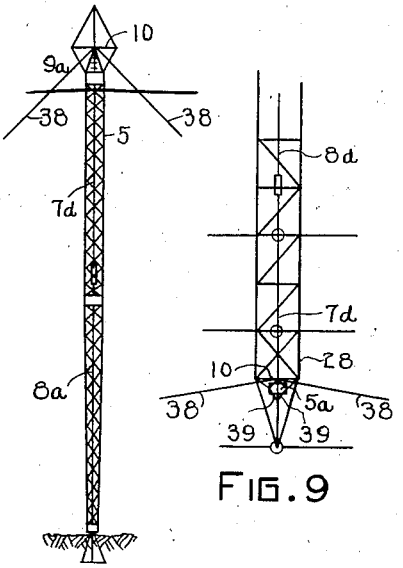
FIG.8
FIG.9
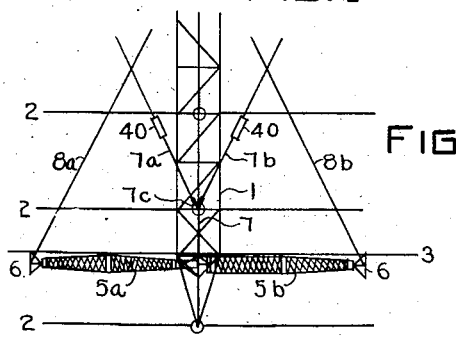
FIG.3
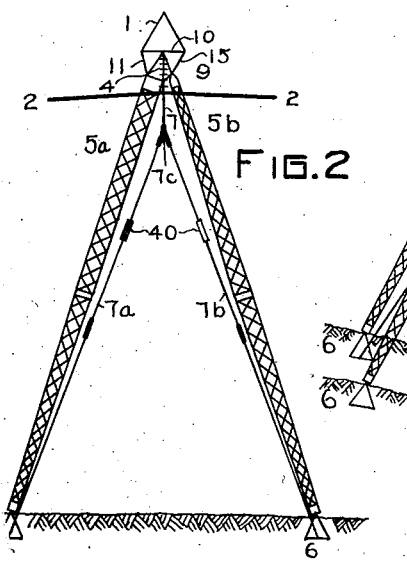
FIG.2
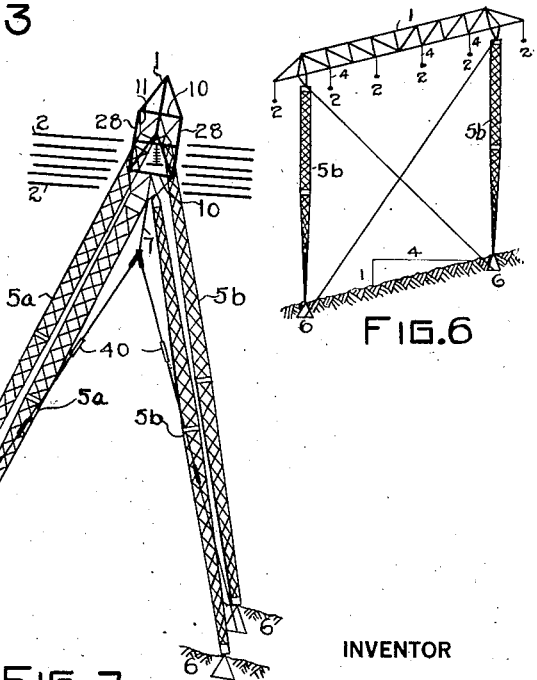
FIG.6
FIG 7
INVENTOR
Percy H. Thomas Feb. 8, 1927.
P. H. THOMAS
1,616,932
UNIVERSAL TRANSMISSION TOWER
Filed March 10, 1926   3 Sheets-Sheet 2
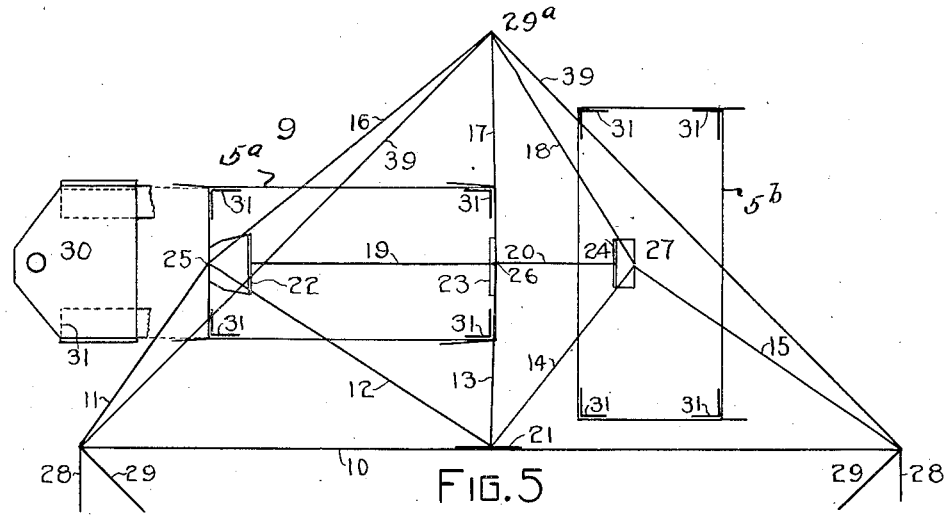
FIG. 5
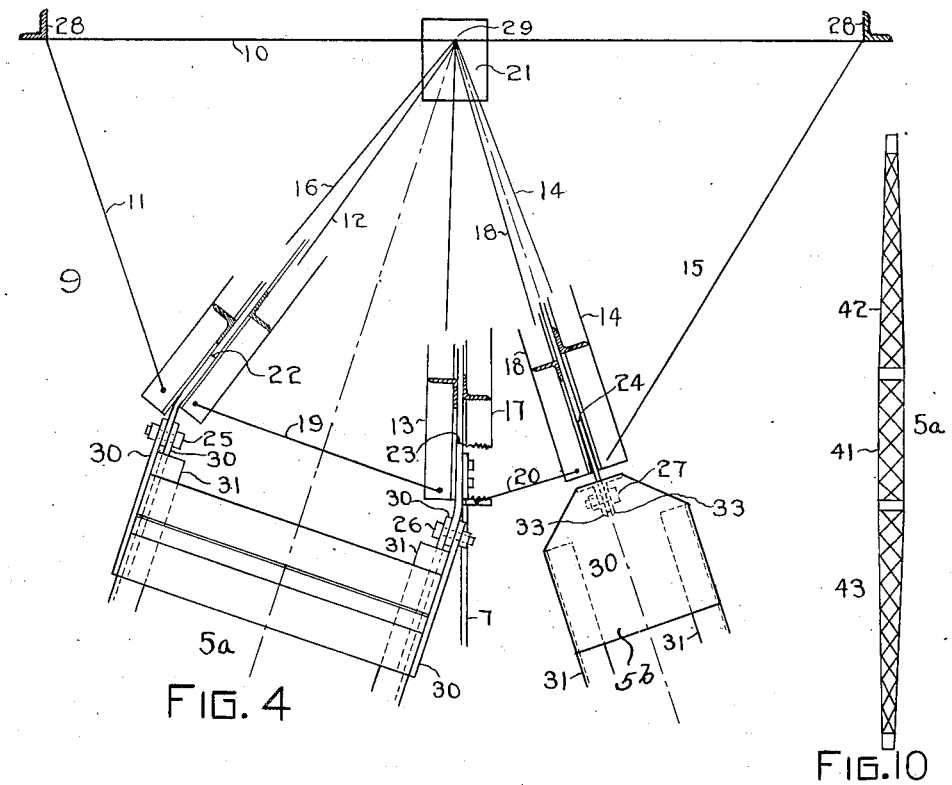
FIG. 4
FIG. 10
INVENTOR
Percy H. Thomas Patented Feb. 8, 1927.

1,616,932

UNITED STATES PATENT OFFICE.

PERCY H. THOMAS, OF UPPER MONTCLAIR, NEW JERSEY.

UNIVERSAL TRANSMISSION TOWER.

Application filed March 10, 1926. Serial No. 93,745.

My invention relates to supporting towers for electric transmission lines and particularly to towers of steel or other material of great rigidity and strength and offers a particularly rugged and economical structure.

I show a tower composed of elements which can be assembled in more than one relation to accommodate the construction to various conditions at the point of installation as will appear hereinafter.

This tower makes use of a number of the design principles shown in my patent applications Serial No. 61,752, filed October 10th, 1925, transmission line towers for electric circuits, and Serial No. 67,159, filed November 5th, 1925, transmission line towers.

I have shown in Figs. 1, 2 and 3 a form of tower with four posts and transverse guys, located on level ground. Fig. 1 is an elevation taken looking along the line and toward the left in Fig. 3. The lacing in the posts $5^a$, $5^b$, is not shown for clearness. Fig. 2 is an end elevation taken looking toward the top of the sheet in Fig. 3, certain crossarm members not being shown. Fig. 3 is a plan view of the left hand end of the tower as shown in Fig. 1.

Figs. 4, 5 and 11 show certain details, especially a method for flexibly connecting a pair of posts to one end of the cross arm. Fig. 4 is an elevation of an extension 9 of the crossarm taken looking toward the top of the sheet in Fig. 3, and Fig. 5 is a plan of the same. Certain elements are shown partly or wholly by center lines and certain are not shown at all for purposes of clearness. Fig. 11 is a perspective view of the construction shown in Figs. 4 and 5, certain crossarm members being broken away for the purpose of clearness. This view is taken looking out from the paper and from the left toward the right in Fig. 2 and from the upper left hand corner of the sheet toward the end of the crossarm that is not shown in Fig. 3. In Figs. 4, 5 and 11 certain members at the end of the cross-arm supporting the conductor 2 are not shown.

In Fig. 6 the same tower is shown located on ground sloping across the line making an inclination of 25% with the horizontal, this view being an elevation taken the same as Fig. 1. Fig. 7 is an elevation of the same tower taken looking across the line located on ground sloping both along and across the line. Figs. 8 and 9 are respectively an end view and a partial plan respectively of another form of tower made up of the same elements as the tower of Fig. 1 and having two posts only, but having both transverse and longitudinal guys. Certain parts are omitted for clearness.

Fig. 10 shows an elongated post for applicant's tower, having an extension inserted at the middle.

In Figs. 1, 2, 3, 4 and 5, showing a four post form of tower, 1 is a crossarm supporting six electrical conductors, 2, 2, and the two ground wires 3, 3. Insulator strings supporting the conductors are shown at 4, 4. The crossarm 1 is framed preferably of steel members such as structural angles put together in the usual way. The crossarm may be supported by two pairs of posts $5^a$, $5^b$ and $5^a$, $5^b$ attached to the crossarm 1 at their upper ends, but spread apart lengthwise of the line at the lower ends. The posts may be supported on any suitable foundations 6, 6, at the ground level, tripods being shown in the illustrations. These posts are so designed and connected to the crossarm that no material bending moment will be introduced in the posts by any movements of the crossarm within reasonable limits. The crossarm will normally be held firmly in place against all stresses acting on it, but should a foundation settle, or a connection stretch a little or the guys be tightened unevenly, there would be a certain movement of the crossarm but this would throw no bending stresses into the posts. This is important since bending stresses would be very severe on the posts.

Similarly the posts are so connected to the foundations or the foundations are so designed that any angular movement of the posts corresponding to the limited movement of the crossarm already described will not throw bending stresses into the post. The post may be hinged to the foundations as shown for longitudinal motion in Figs. 1 and 2 where the post is carried on a bolt 35, which in turn passes through the tops of three angles 36 connected in the form of a tripod, with a base 37, or the connection may merely be designed for flexibility as for example, as shown for transverse motion in Figs. 1 and 2 also.

The crossarm is restrained from lateral motion by the transverse guys 7 and 8. Each of these guys is connected to an extension 9 fastened to the crossarm 1 and divides at the connector or equalizer $7^c$ or $8^c$ into two guy rods, $7^a$, $7^b$ and $8^a$, $8^b$ respectively. These divided guy rods are connected to anchors or foundations near the bottom of the posts $5^a$ and $5^b$ as shown. By this arrangement I secure the distribution of the stresses produced in the posts by the transverse pull on the crossarm and when the guys are connected directly to the foundations of the posts, as here shown, the weight of the tower and its load at each post is in opposition to any uplift on the guy. I further secure an attachment of the transverse guys 7 and 8 to the crossarm 1 in such a way that no bending in a plane perpendicular to the crossarm is produced and no bending stresses in the posts. This arrangement further serves to give an indication of the relative tightness of either pair of guys $7^a$, $7^b$ or $8^a$, $8^b$, for the connectors $7^c$ and $8^c$ will be pulled to one side if either guy of the pair is too tight. The guys 7 and 8 are attached to the extensions at a point on the central plane of the crossarm.

Longitudinal stresses on the crossarm whether due to conductors, ground wires, wind or other cause are taken up by horizontal components of the axial stresses in the posts, for these posts taking no bending have only axial stresses. The vertical components of the stresses in the posts due to horizontal longitudinal stresses on the crossarm are equal and of opposite sign and neutralize each other at the top.

All downward stresses including the weight of the crossarm are divided between the 4 posts according to the well known laws of mechanics.

I have not shown the details of the particular framing of the crossarm or the posts and foundations for this will be evident to those skilled in the art. Certain members are omitted for the sake of clearness, as for example, the bracing of the posts $5^a$ and certain details of the extension 9. I have shown the arrangement of elements, however, and all the features necessary for the understanding and utilization of the novel features of my tower.

In Figs. 4 and 5 which are respectively an elevation and a plan, I have shown enlarged the extensions 9, 9, of the crossarm 1, to which are attached the posts $5^a$, $5^b$ $5^a$, $5^b$, and details of suitable connections between the posts and the crossarm. In these figures I have used center lines or gauge lines largely to represent the steel members which will usually be of structural steel angles. I have shown portions of angles in outline where this is necessary for clearness. Fig. 11 shows in perspective the same construction as Figs. 4 and 5, the same numerals being applied to the same members in all the figures. The crossarm is shown as extending backwardly and to the right. The angles 33, the plates 30, 30, 22, 23, 24 and bolts 25, 26, and 27, forming the flexible connections between the posts and the crossarm are shown clearly The members 19, 20 are braces bolted to the flanges of the angles 12, 13 and 17, 18.

Referring to Fig. 4, 10 is a strut or tie angle, being a part of the crossarm shown also in Fig. 3 and in Fig. 7. This is the member to which a ground wire may be connected when used. This member 10 connects the two main crossarm chord angles 28, 28.

The post $5^a$ is connected to the extension 9 by two heavy bolts 25 and 26 acting as hinges between the crossarm and the post for motion of the crossarm transversely. In the post these bolts are carried by two pairs of plates 30, 30, bolted or riveted to the main angles 31, 31, of the post $5^a$, two angles being connected to one pair of plates. The bolts 25 and 26 pass through holes in the plates 22 and 23 which are part of the crossarm extension 9, this securing the posts to the crossarm in such a manner as to permit free motion of the crossarm transversely without putting bending moment in the posts. This connection, however, is stiff against angular motion in the plane containing the axis of the post and the two bolts 25 and 26. This stiffness is useful in steadying the crossarm against wind pressure along the line, which would otherwise overturn the crossarm. However, this wind pressure is only that acting on the members above the plane of the angles 28, for stress in that plane is resisted by the posts by axial stresses, these posts having their axis meeting in the line of the centers of the members 10, see Fig. 4. The residual bending moment of longitudinal wind must be taken by the posts but will be so small as to be unobjectionable. The post is given a suitable cross sectional shape for this purpose.

The plates 22 and 23 taking the stresses from the post $5^a$ are carried by two angles 12 and 13 connecting to the plate 21 secured to the member 10 at its center and the angles 16 and 17 connected at the point $29^a$ (see Fig. 5) to the angles 39, 39, which are extensions of the angles 28, 28 and also to the angle 32 (see Fig. 1) from above. The plates 22 and 23 are connected together by the angle 19, secured to the legs of the angles 12 and 13.

The post $5^b$ is connected to the crossarm extension 9 through the plate 24 by means of the bolt 27, much in the same way as post $5^a$, but a single bolt is used so that the connection may be flexible both transversely and longitudinally. The plate 24 and the bolt 27 are secured to the post at the center point of its top by two angles 33, which run across the post to transfer the stresses to the plates 30, 30 and the main corner angles 31. The plate 24 is carried by the angles 14 and 18 connected respectively to the plate 21 and to the angles 16 and 17 and 32 at the point $29^a$. The plates 23 and 24 are connected together through the angle 20. It will be noticed that a transverse movement of the crossarm 1 will tend to bend the plates 22, 23 and 24, since they do not lie strictly in parallel planes. However, in practice this will be of no disadvantage because for any degree of motion likely to exist the amount of this bending will not be important and because the posts are free to rotate on their axes to a certain extent.

The angles 11 and 15 connect the plates 22 and 24 to the angles 28 at their point of connection to the ends of the member 10, securing the crossarm against overturning.

There is advantage in using a connector or equalizer 34 at the point where the guys 7ª, 8ª and 7ᵇ, 8ᵇ, cross as this supports these guys and gives a certain control of the clearance between the conductors 2 and the guys by determining the angle at which the guy 7 or 8 leaves the post top.

Turnbuckles or other length adjusting means 40 should be inserted in the guys at a sufficient number of points to permit adjustment of stress and position for all guys.

Certain members have been omitted in these figures to clarify the drawings so that the construction may be clear, but they may easily be supplied by those skilled in the art.

This tower of Figs. 1, 2 and 3 may be used on sloping ground. If the slope is across the line, the posts may still be placed vertical and the guys readjusted as shown in Fig. 6. In this case the crossarm will be generally parallel to the surface of the ground. The clearance from the conductors to the guys will be somewhat affected but not seriously and in any case any desired clearance may be provided for by design. This use of my tower avoids the necessity of excavation of the ground on the high side or building up under the posts on the lower side on such sloping ground. This is often of very great advantage.

When the ground slopes with the line the tower may be installed on the actual surface of the ground as it lies throwing the center line of the tower off the vertical and for reasonable slopes no material disadvantage results. The stresses due to dead load are increased on the down hill posts but the stresses due to longitudinal load are decreased on this post, so that for reasonable angles no special construction is required. This condition is shown in Fig. 7 in which the tower of Fig. 2 is shown on ground sloping both with and across the line, the ground under the back posts being the higher. In Figs. 6 and 7 the same posts are designated by the same numerals as in Figs. 1, 2 and 3. In Fig. 7 some members have been omitted for the sake of clearness, but they may be readily supplied by those skilled in the art.

By this method of adjusting the tower to the slope of the ground I avoid much expense and difficulty in side hill extensions such as are required in many towers of the standard type.

In general I prefer to fabricate the posts in two parts, each part being assembled and galvanized in the shop and the two being bolted together in the field, the separation being at or near the middle and the section being square at this point. In this case all four posts may be made of identically the same members, the top halves being assembled on the lower halves with the post 5ª in a position at right angles to that for posts 5ᵇ. The plates 30, 30 may be used in all post tops but the angles 33 must be added in post 5ᵇ to carry the bolt 27.

Where circumstances permit I may use 2 posts, for example, 2 posts 5ª of Figs. 1, 2 and 3 in place of 4. In this case I add longitudinal guys 38, Fig. 8, connected to each post preferably at the middle point of the member 10 of the crossarm corresponding to the member 10 of the Figs. 1, 2 and 3, these guys taking up longitudinal stresses. In this case the crossarm extension 9ª corresponding to the extension 9 of Figs. 1, 2, 3 must be somewhat differently framed since there is but one post to be connected. Such framing need not here be shown as it involves no novel problems. The extension 9ª is symmetrical about a vertical plane through the middle of the crossarm.

This tower of Fig. 8 is shown in plan in Fig. 9, where similar parts are similarly numbered. One of the transverse guys for the structure of Figs. 8 and 9 is shown at 7ᵈ, the other guy 8ᵈ being similar but oppositely placed. The longitudinal guys 38 may to advantage make a small angle with the center line of the transmission line to give a little support to the transverse guys and to improve the clearance from the conductors.

As shown in the various figures, on account of the transverse flexibility of the connections between post 5ª and the crossarm, and where four posts are used the flexibility in both directions of the connection between the post 5ᵇ and the crossarm, the structure as a whole may be subjected to sinking of foundations, irregularities of installation, stretching or improper adjustment of guys, etc., without throwing undue stresses into the posts or other members of the tower. This is in contrast to the conditions in the standard four legged type of tower, wherein any yielding of foundations must cause serious strains in the rigid structure.

The present type of tower gives what might be called a universal structure which may be used for many sorts of sites and conditions as may be most convenient. Where ground space is important the arrangement of Figs. 1, 2 and 3 is suitable, while that of Figs. 8 and 9 is usually more economical where guys may be permitted. The arrangement of Figs. 8 and 9 is similar in many respects to structures shown in my applications Serial No. 61,752 and Serial No. 67,159, above referred to.

It will be noted that certain elements, the more important parts, are the same in all uses of the tower, while certain other parts, largely the connections, vary for different ground conditions and other causes. For example, both the upper and lower post sections are all the same, also the crossarm is always the same, excepting the extension 9 or 9ª which in this sense is to be taken as attached to the crossarm rather than a part of it.

The material and form of the guy also remains the same although the length varies. The connections, as for example the bolt hinges, are differently arranged for different embodiments also the guy connections and the guy lengths. This layout is favorable for economy for the special parts for the line as a whole are reduced to a minimum. Where the slopes of the ground are not uniform or where desirable for other reasons, I contemplate the lengthening of one or more posts to conform to the ground or other conditions. This lengthening is accomplished preferably by inserting a length of post between the top and bottom elements above described. Such an extension piece is shown in Fig. 10, where the member 41 is inserted between the post top 42 and the post bottom 43 of the post 5ª.

I claim as my invention—

1. A transmission tower, comprising a crossarm, a pair of posts near each end thereof, one post of each pair being hinged to said crossarm at two points, each permitting transverse motion of said crossarm, but restraining rotation of said crossarm, the other post of the pair being hinged to said crossarm at one point also permitting transverse motion of said crossarm.

2. A transmission tower comprising a crossarm, posts in pairs under said crossarm for taking up stresses on said crossarm and means for preventing rotation of said crossarm about its long axis, said means including connections, rigid against such rotation, from said crossarm to one of said posts.

3. A transmission line tower, including a crossarm, two supporting posts near each end of said crossarm, foundations for said posts and a guy for each end of said crossarm restraining transverse movement, each guy including a single portion attached to the crossarm and a divided portion connected to said single portion, spreading diagonally and connected to the foundations of two of said posts on the opposite side of said tower.

4. A transmission line tower, including a crossarm, two supporting posts near each end of said crossarm, foundations for said posts and a guy for each of said crossarm ends restraining transverse movement, each guy including a single portion attached to the crossarm and a divided portion connected to said single portion and spreading diagonally and connected to anchors on the opposite side of said crossarm.

5. A transmission tower comprising a crossarm, two posts under each end spread apart at the bottom lengthwise of the line, connections between said crossarm and said posts, the connections to one post being rigid for motion in the plane of the two posts and the connection to the other being flexible in this plane.

6. The combination of a conductor bearing crossarm, supporting posts thereunder in pairs, spread apart at the lower ends lengthwise of the line and connections to said posts from said crossarm, the connections to one post being rigid against relative motion in the plane of the posts.

7. The combination of a conductor bearing crossarm, supporting posts thereunder in pairs, spread apart at the lower end lengthwise of the line and flexible connections to said posts from said crossarm, the connections to one post being rigid against relative motion in the plane of the posts.

8. A transmission tower, including a crossarm, supporting posts under said crossarm near each end, connections between said posts and said crossarm, said posts and said connections permitting transverse motion of said crossarm and preventing longitudinal motion thereof and rigid connections between said crossarm and one of said posts for preventing rotation of said crossarm, together with means for fixing the position of said crossarm on said posts transversely.

9. A transmission line tower comprising a crossarm extending across the line with attachment devices for carrying electric conductors, supporting posts in pairs spread apart at the bottom in the direction of the line on both sides of the center of said crossarm, mechanical connections between said crossarm and said posts, permitting free movement of said crossarm transversely of said line, and means for limiting said transverse movement.

10. A transmission line tower comprising a crossarm extending across the line with attachment devices for carrying electric conductors, supporting posts in pairs spread apart at the bottom in the direction of the line on both sides of the center of said crossarm, mechanical connections between said crossarm and said posts, permitting free movement of said crossarm transversely of said line, and limited angular movement of one post with regard to the other in the plane containing the two posts.

11. A transmission line tower comprising a crossarm extending across the line with attachment devices for carrying electric conductors, supporting posts in pairs spread apart at the bottom in the direction of the line on both sides of the center of said crossarm, mechanical connections between said crossarm and said posts, permitting free movement of said crossarm transversely of said line, and means for limiting said transverse movement, together with foundations connected with said posts, flexible to permit said limited motion without developing bending moments in said posts.

12. A transmission line tower comprising a crossarm extending across the line with attachment devices for carrying electric conductors, supporting posts in pairs spread apart at the bottom in the direction of the line on both sides of the center of said crossarm, mechanical connections between said crossarm and said posts, permitting free movement of said crossarm transversely of said line and transverse guys connected between the bases of the posts of one pair and a point on the crossarm near the connection between it and the tops of the posts of the other pair.

13. A transmission line tower, comprising a rigid crossarm extending across the line, attachment means for supporting insulator strings on said crossarm, all lying in a plane of resistance in said crossarm, supporting posts in pairs under said crossarm on both sides of the center, the axes of the posts of each pair when extended meeting at a common point in said plane of resistance.

14. A transmission line tower, comprising a rigid crossarm extending across the line, attachment means for supporting insulator strings on said crossarm, all lying on a straight transverse line in said crossarm, supporting posts in pairs under said crossarm on both sides of the center, the axis of each post when extended intersecting said straight line.

15. A structure for supporting a plurality of parallel aerial cables spaced apart horizontally, comprising a rigid transverse member extending over and across said cables, hanger attachment means for said cables thereon, all located in a straight line, compression bearing supporting members under said transverse member in pairs and on both sides of the center, said supporting members being spread apart at the ground line in a direction parallel to the cables, the compression axes of said supporting members when extended meeting in pairs on the said straight line, together with flexible connections between each of said supporting members and the transverse member and between the two of each pair of supporting members, permitting a certain horizontal motion of said transverse member and separate means for limiting transverse motion of said member.

16. A transmission line tower, including a crossarm extending across the line, two supporting posts spread apart at the base along the line on each side of the center, separate connections from each post to said crossarm, said connections permitting a certain transverse movement, opposed guys therefor limiting said transverse movement, connected to said crossarm at the top between said posts on one end of the crossarm and at the lower end to foundations of the posts under the other end of the crossarm.

17. A transmission line tower comprising a rigid crossarm extending across said line and provided with a plane of resistance, attachment points for insulator strings in said plane, feet under said crossarm on both sides of the center framed rigidly thereto, and rigid posts carrying downward stresses under said feet and connected thereto by devices flexible for transverse motion of said crossarm, together with opposed tension members connected to said crossarm in said resistance plane.

18. In a transmission line tower, a rigid cable carrying crossarm, including trussed members lying in a plane substantially parallel to the ground for receiving stresses from the said cables and the stresses resisting displacement, compression carrying posts under said crossarm but shorter than the distance from said trussed members to the ground and supporting feet narrow at the bottom rigidly framed in said crossarm below the plane of said trussed members together with connections between said posts and the bottoms of said feet permitting relative movement between said crossarm and said posts across the line, but resisting rotation of said crossarm in a vertical plane parallel to the line.

19. A transmission line tower, comprising a rigid cable carrying crossarm extending across the line, a group of stress resisting members each side of the center of said crossarm, each group including at least one independent compression member supporting said crossarm above the earth and flexibly connected thereto, said stress resisting members serving to resist vertical, transverse and longitudinal load stresses on said crossarm, the line of action of each of said stress resisting members intersecting a straight line lying lengthwise of said crossarm and intersected by said vertical and said longitudinal load stresses.

20. A transmission line tower, comprising a rigid cable carrying crossarm extending across the line, including a plane of resistance for carrying longitudinal load stresses, a plurality of cable supports on said crossarm, located in said plane of resistance and lying along a straight line lengthwise in said crossarm, and a group of stress resisting members on each side of said crossarm and connected thereto and spread apart at the ground level, each group containing at least one compression member, said stress resisting members serving to support the crossarm above the ground and to take up horizontal and vertical loads on said crossarm, the lines of action of all of said stress resisting members passing through said straight line, together with foundations for said stress resisting members, and means for protecting said compression members from bending moments, due to limited movement of said foundations, maladjustments in erection and accidental irregularities, said means including flexible elements in the mechanical connections of said compression members.

21. A transmission line tower, comprising a rigid cable carrying crossarm extending across the line, including a plane of resistance for carrying longitudinal load stresses, a plurality of cable supports on said crossarm, located in said plane of resistance and lying along a straight line lengthwise in said crossarm, and a group of stress resisting members on each side of the center of said crossarm and connected thereto and spread apart at the ground level, said groups being similar and each group containing at least one compression member, said stress resisting members serving to support the crossarm above the ground and to take up horizontal and vertical loads on said crossarm, the planes of action of the similar stress resisting members of said groups, taking up the longitudinal and the vertical forces, passing through said straight line, together with foundations for said stress resisting members and means for protecting said compression members from bending moments, due to limited movement of said foundations, maladjustments in erection and accidental irregularities, said means including flexible elements in the mechanical connections of said compression members.

Signed at New York, in the county of New York and State of New York, this 9th day of March A. D. 1926.

PERCY H. THOMAS.